United States Patent
Hori et al.

(10) Patent No.: US 10,785,481 B2
(45) Date of Patent: *Sep. 22, 2020

(54) METHOD AND SYSTEM FOR VIDEO CODEC RATE-DISTORTION PERFORMANCE BY PRE AND POST-PROCESSING

(71) Applicant: CRUNCH MEDIAWORKS, LLC, San Mateo, CA (US)

(72) Inventors: Bjorn Steven Hori, Albany, CA (US); Karthik Raja Thangaraj, Fremont, CA (US)

(73) Assignee: CRUNCH MEDIAWORKS LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/290,554

(22) Filed: Mar. 1, 2019

(65) Prior Publication Data

US 2019/0200015 A1  Jun. 27, 2019

Related U.S. Application Data

(63) Continuation of application No. 14/776,987, filed as application No. PCT/US2013/032303 on Mar. 15, 2013, now Pat. No. 10,230,951.

(51) Int. Cl.
*H04N 7/24* (2011.01)
*H04N 11/02* (2006.01)
(Continued)

(52) U.S. Cl.
CPC ......... *H04N 19/117* (2014.11); *H04N 19/132* (2014.11); *H04N 19/147* (2014.11);
(Continued)

(58) Field of Classification Search
CPC ...... H04N 19/117; H04N 19/59; H04N 19/85; H04N 19/172; H04N 19/44; H04N 19/192;
(Continued)

(56) References Cited

U.S. PATENT DOCUMENTS

| | | | |
|---|---|---|---|
| 8,566,442 B2 | 10/2013 | Jiang et al. | |
| 9,014,545 B2 | 4/2015 | Park et al. | |
| 9,521,354 B2 | 12/2016 | Park et al. | |
| 2002/0145610 A1* | 10/2002 | Barilovits | G09G 5/395 |
| | | | 345/538 |

(Continued)

FOREIGN PATENT DOCUMENTS

| | | |
|---|---|---|
| EP | 1631090 A1 | 3/2006 |
| KR | 10-0121164 B1 | 12/1997 |

(Continued)

OTHER PUBLICATIONS

Extended European search report dated Jul. 27, 2016; Application No. 13878431.9; Applicant Icelero Inc.

(Continued)

*Primary Examiner* — Susan E. Hodges
(74) *Attorney, Agent, or Firm* — The Villamar Firm PLLC; Carlos R. Villamar

(57) ABSTRACT

A system, method and computer program product for improving video codec performance, including a pre-processing stage configured for downscaling by a variable amount an uncompressed video signal before sending such downscaled, uncompressed video signal to an input of a video codec; and a complimentary post-processing stage configured for upscaling the decompressed video signal received from an output of the video codec back to its original resolution before transmitting the decompressed video signal. The system, method and computer program product provides improved rate-distortion performance compared to direct use of the video codec alone.

21 Claims, 5 Drawing Sheets

(51) Int. Cl.
| | |
|---|---|
| *H04N 7/12* | (2006.01) |
| *G06T 9/00* | (2006.01) |
| *H04B 1/66* | (2006.01) |
| *H04N 19/117* | (2014.01) |
| *H04N 19/147* | (2014.01) |
| *H04N 19/593* | (2014.01) |
| *H04N 19/132* | (2014.01) |
| *H04N 19/192* | (2014.01) |
| *H04N 19/172* | (2014.01) |
| *H04N 19/85* | (2014.01) |
| *H04N 19/59* | (2014.01) |
| *H04N 19/44* | (2014.01) |

(52) U.S. Cl.
CPC ......... *H04N 19/172* (2014.11); *H04N 19/192* (2014.11); *H04N 19/44* (2014.11); *H04N 19/59* (2014.11); *H04N 19/593* (2014.11); *H04N 19/85* (2014.11)

(58) Field of Classification Search
CPC ... H04N 19/132; H04N 19/593; H04N 19/147
USPC ........................................................ 375/240
See application file for complete search history.

(56) References Cited

U.S. PATENT DOCUMENTS

| | | | |
|---|---|---|---|
| 2007/0160134 A1* | 7/2007 | Segall | H04N 19/46 375/240.1 |
| 2010/0080283 A1 | 4/2010 | Ali et al. | |
| 2012/0026288 A1 | 2/2012 | Tourapis et al. | |
| 2014/0022452 A1* | 1/2014 | Ivanovic | H04N 7/0117 348/441 |

FOREIGN PATENT DOCUMENTS

| | | | | |
|---|---|---|---|---|
| WO | 2012058394 A1 | 5/2012 | | |
| WO | WO-2012058394 A1 * | 5/2012 | ........... | H04N 19/117 |

OTHER PUBLICATIONS

PCT ISR and WO Ser. No. PCT US2013/032303 dated Dec. 13, 2013 (Dec. 13, 2013).

C.Andrew Segall et al., 'Pre- and Post-Processing Algorithms for Compressed Video Enhancement', Signals, Systems and Computers, 2000. Conference Record of the Thirty-Fourth Asilomar Conference on (vol. 2), Oct. 29, 2000-Nov. 1, 2000.

Inkyeom Kim et al., 'The Block-Based Preprocessing System for the Coding Performance Improvement', Consumer Electronics, 1998. ICCE. J 998 Digest of Technical Papers. International Conference on, Jun. 2-4, 1998.

* cited by examiner

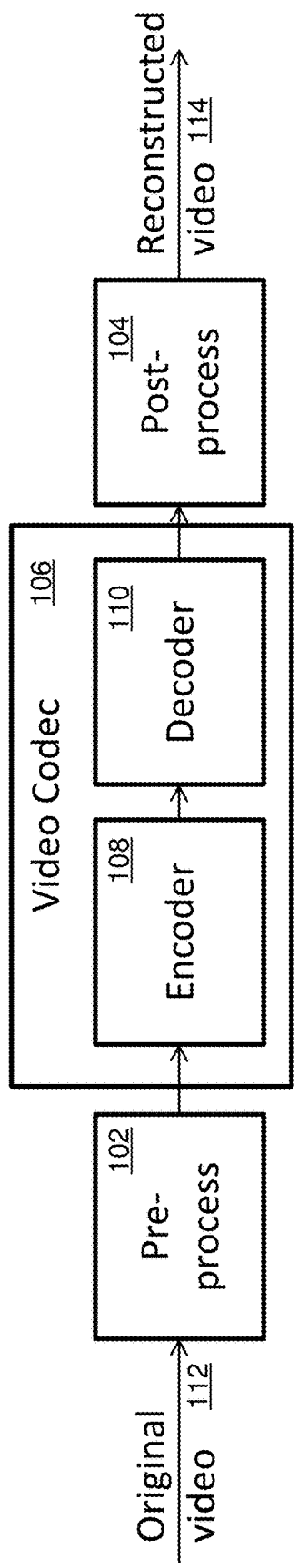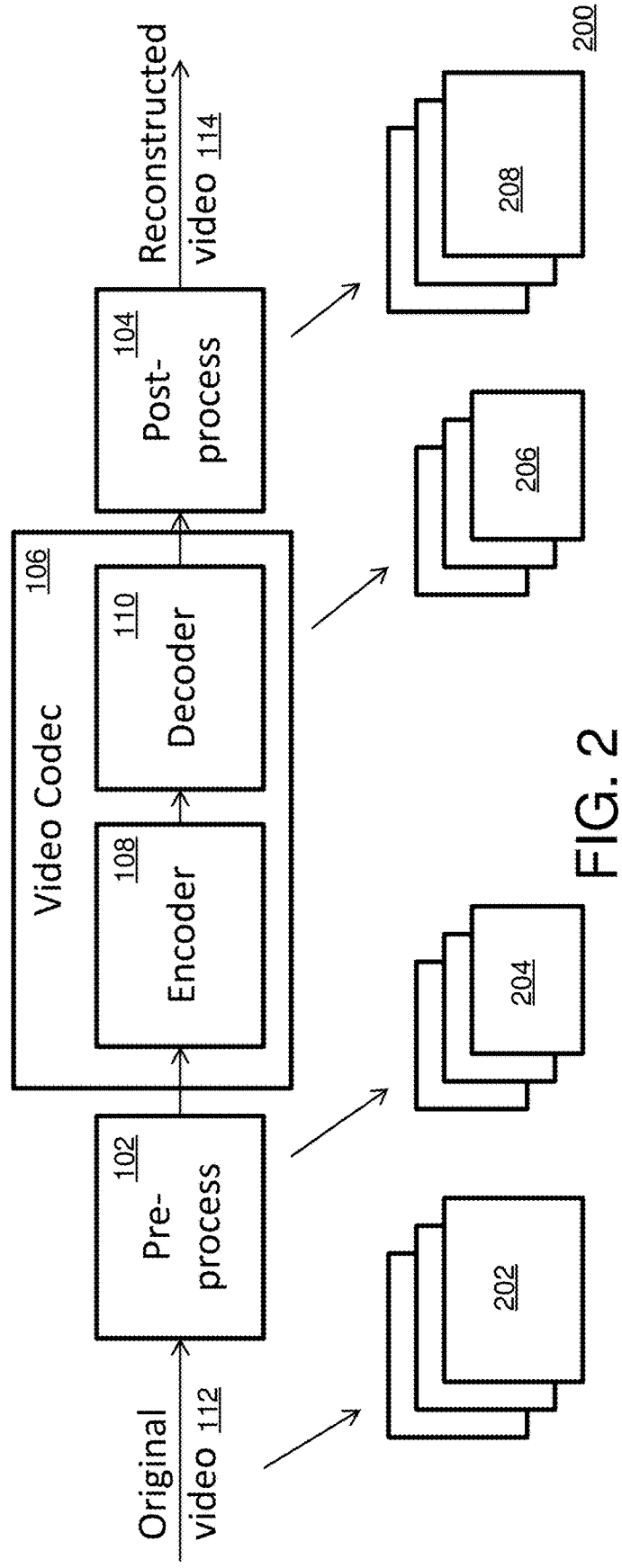

METHOD AND SYSTEM FOR VIDEO CODEC RATE-DISTORTION PERFORMANCE BY PRE AND POST-PROCESSING

CROSS REFERENCE TO RELATED DOCUMENTS

The present invention is a continuation of U.S. patent application Ser. No. 14/776,987 of Bjorn Steven HORI et al., entitled "METHOD AND SYSTEM FOR VIDEO CODEC RATE-DISTORTION PERFORMANCE BY PRE AND POST-PROCESSING," filed on 15 Sep. 2015, now allowed, which is a National Stage Entry of PCT Application Serial No. PCT/US2013/032303 of Bjorn Steven HORI et al., entitled "METHOD AND SYSTEM FOR IMPROVED VIDEO CODEC RATE-DISTORTION PERFORMANCE BY PRE AND POST-PROCESSING," filed on 15 Mar. 2013, now inactive, the entire disclosures of all of which are hereby incorporated by reference herein.

BACKGROUND OF THE INVENTION

Field of the Invention

The present invention generally relates to systems and methods for video compression (e.g., coding and decoding), and the like, more particularly to systems and methods for improved video compression performance using supplemental pre and post processing, and the like.

Discussion of the Background

In recent years, systems and method for video coding and decoding using a video codec (COmpression-DECompression), and the like, have been developed and continually refined. However, such systems and methods for video coding and decoding, and the like, have been hindered by various limitations, for example, including limitations related to rate-distortion performance particularly at lower bit-rates, and the like.

SUMMARY OF THE INVENTION

Therefore, there is a need for methods and systems that address the above and other problems with systems and methods for video coding and decoding, and the like. Accordingly, the above and other needs are addressed by the illustrative embodiments of the present invention, which provide a novel method and system that introduces pre- and post-processing stages before and after a video codec (COmpression-DECompression), which can yield improved rate-distortion performance compared to direct use of the video codec alone (e.g., both for subjective and objective quality measures). In practice, the invention introduces a supplementary human-vision perceptual model (e.g., in addition to the model resident in the codec), which more tightly bounds the range of outputs from the video codec (e.g., holding all other variables constant). Advantageously, the invention is video codec agnostic, and can be successfully applied to numerous commercially available video codecs, and the like.

Accordingly, in an illustrative aspect, there is provided a system, method and computer program product for improving video codec performance, including a pre-processing stage configured for downscaling by a variable amount an uncompressed video signal before sending such downscaled, uncompressed video signal to an input of a video codec; and a complimentary post-processing stage configured for upscaling the decompressed video signal received from an output of the video codec back to its original resolution before transmitting the decompressed video signal. The system, method and computer program product provides improved rate-distortion performance compared to direct use of the video codec alone.

Run-time parameters of the pre-processing stage and the complimentary post-processing stage allow for dynamic modulation of distortion preference, from nearly all video codec induced distortion to nearly all pre- and post-processing induced distortion, or any desirable combination thereof.

A distortion measurement system is provided and configured for controlling the run-time parameters based on analysis of characteristics of the uncompressed input video signal, characteristics of its compressed representation if it was originally delivered in a compressed state, a desired output data-rate, and a rate-distortion performance of the video codec.

The distortion measurement system includes a first distortion measuring stage configured to measure pre and post processing induced distortion; a second distortion measuring stage configured to measure induced distortion of the video codec alone; and a third distortion measuring stage configured to measure total induced distortion Still other aspects, features, and advantages of the present invention are readily apparent from the following detailed description, simply by illustrating a number of illustrative embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings, in which like reference numerals refer to similar elements, and in which:

FIG. 1 is an illustrative system block diagram including pre- and post-processing blocks shown in context with a video codec and video input and output;

FIG. 2 expands the system block diagram of FIG. 1 to include representation of pre- and post-processing scaling filters;

DETAILED DESCRIPTION OF THE PREFERRED EMBODIMENTS

Figure 3:
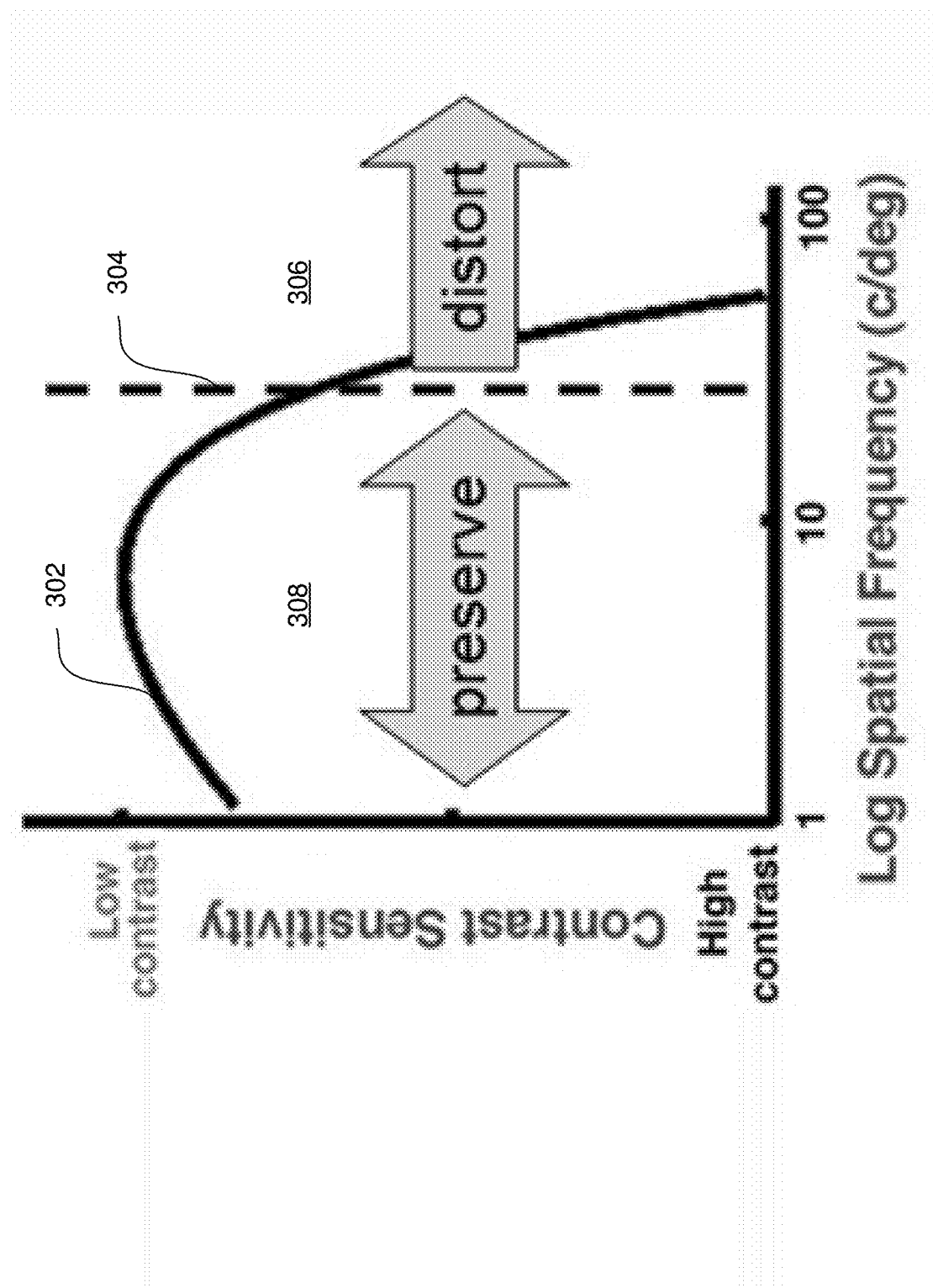
FIG. 3, shows an average human contrast-sensitivity function overlaid with digital filter cutoff frequency in one dimension (e.g., the invention actually applies digital filters in two dimensions)

The present invention includes recognition that a video codec (COmpression-DECompression) algorithm can be used to reduce the amount of data employed to represent a given video sequence (e.g., "video") by one of two fundamental means, including "lossless" coding techniques and "lossy" coding techniques. Lossless coding techniques allow for perfect reconstruction of the video upon decompression, but provide very limited reductions in the data employed to represent the video. Lossy coding techniques intentionally introduce distortion making a tradeoff between fidelity (e.g., trueness to the original video according to some metric) and data requirements for representation.

Such a tradeoff is made according to human-vision perceptual models, which attempt to keep distortion below the threshold of perception. Compared to lossless coding techniques, lossy coding techniques can realize very large reductions in the data employed to represent the video. Lossy video codecs in common use today include MPEG-2 (e.g., broadcast digital TV, DVD) and H.264 (e.g., Blue ray Disc, Internet video streaming Adobe Flash Player, Microsoft Silverlight).

Video capture and delivery to network connected mobile devices, such as "smartphones" and "tablets," and the like, is an area of tremendous growth and interest recently. However, the wireless cellular data networks that connect these devices to the internet to retrieve, store, or share video content, are highly constrained compared to typical personal-computer internet connections (e.g., DSL, Cable, T1), which typically forces content providers targeting mobile devices to tune their video codecs to operate in a range where distortion is perceptible.

Compression performance (e.g., the amount the data representation is reduced) is often measured and quoted in bits-per-pixel after compression to represent the original video sequence at a given quality. Another, and equivalent, way of characterizing compression performance is bits-per-second employed for the compressed representations, but for this value to have significance one would have to also know the resolution (e.g., width and height) and frame-rate of the original video.

Quality is measured subjectively and objectively. Subjective quality measurements are generally the consensus opinion of a panel of critical viewers (e.g., commonly referred to as Mean-Opinion-Score or MOS). Objective quality measurements are analytical calculations that generally determine the level of "difference" or "similarity" between the original video sequence and the compressed version. Quality measures are often referred to as "distortion" measures as they characterize the differences, or distortions, the compression process has imparted on the video.

Modern video codecs, such as MPEG-2 and H.264 are very sophisticated systems, which for a given input can produce a range of possible outputs (e.g., various related data rates and qualities). The most fundamental parameters of operation of a video codec explore the tradeoffs between data rates (e.g., bits-per-pixel), video quality (or e.g., inversely, distortion), and algorithmic or computational complexity (e.g., the effort employed to achieve the compression result).

One typically cannot optimize all three of these fundamental parameters simultaneously. Accordingly, the following generalizations may apply (e.g., for a given video input): (1) Lower data rates are associated with lower quality; and (2) Higher complexity is associated with higher quality for a given data rate.

When a video codec is targeting lower data rates, distortion typically becomes visible. The type and nature of the visible distortion is controlled algorithmically by the codec, but when pushed to extremely high compression-performance (e.g., low bits-per-pixel or low bits-per-second), at a certain point, the codec has little choice but to produce widespread visible distortion in its output to satisfy the targeted data rate and level of computational complexity.

To address the above and other problems with systems and methods for video coding and decoding, and the like, generally, the illustrative method and system introduce pre- and post-processing stages before and after a video codec, which can yield improved rate-distortion performance compared to direct use of the video codec alone (e.g., both for subjective and objective quality measures).

Referring now to the drawings, in FIG. 1 there is shown an illustrative system block diagram 100 including pre- and post-processing blocks shown in context with a video codec and video input and output. In FIG. 1, the system 100 can include a pre-processing stage 102 before a coder 108 of a video codec 106, and a post-processing stage 104 after a decoder 110 of the video codec 106. The stages 102 and 108 can be configured as two-dimensional digital filters, and the like, that rescale a video sequence on a frame-by-frame basis, altering its spatial dimensions and introducing distortion related to the scaling operations.

For example, the pre-processing filter 102 downscales the width and height dimensions of the video frame from the original width and height to smaller dimensions, resulting in an alternative representation of the video frame that contains fewer pixels. Such alternative representation is input into the video codec 106 instead of the original video 112. With fewer pixels to encode, the video codec 106 can realize a lower level of distortion, relative to encoding the original video 112 at the same target data rate (e.g., with fewer pixels to encode the bits-per-pixel allocation goes up, reducing codec induced distortion). The post-processing filter 104 upscales the output from the video codec 106 as reconstructed video 114 back to the input videos original width and height dimensions.

FIG. 2 expands the system block diagram of FIG. 1 to include representation of pre- and post-processing scaling filters. In FIG. 2, the distortion introduced by the pre-processing filter 102 and the post-processing filter 104 is deterministic and concentrated in higher spatial frequencies where human contrast sensitivity is lowest, in contrast to video codec distortion, which at lower data rate targets becomes non-deterministic and generally distributed across the spatial frequency spectrum. Accordingly, frames 202 of the original video 112 are downscaled by the pre-processing filter 102, as frames 204, processed by the codec, as frames 206, upscaled by the post-processing filter 104, as frames 208, to generate the reconstructed video 114.

The magnitude and perceptibility of the inventions induced distortion is variable and determined by the combination of: (1) The degree to which the spatial dimensions are altered; (2) Complexity of the digital filters chosen to perform the alteration; (3) Characteristics of the original video sequence.

FIG. 3 shows an average human contrast-sensitivity function 302 overlaid with digital filter cutoff frequency 304 of the digital filter 102 in one dimension (e.g., the invention actually applies digital filters in two dimensions). In FIG. 3, the digital filter 102 of the invention removes the higher spatial frequencies 306 to the right of the dashed filter cut-off frequency 304, while generally preserving the lower spatial frequencies 308 to the left of the dashed filter cut-off frequency. The selection of the filter cut-off frequency 304 is a function of the degree of resolution downscaling applied, wherein higher levels of downscaling correspond to moving the filter cut-off frequency towards the left, which in turn corresponds to greater invention induced distortion.

Invention induced distortion is not solely determined by the selection of filter cut-off frequency (e.g., cut-off frequency determines "band-limiting" artifacts), but also by the quality of the actual filter selected to perform the operations. Filter quality is typically proportional to computational complexity while the "aliasing" artifacts introduced by the filtering process are typically inversely proportional.

The following generalizations apply: (1) Lower levels of dimensional scaling are associated with lower levels of invention induced distortion; and (2) More complex digital filters are associated with lower levels of invention induced distortion. The total distortion imparted on a compressed video in the presence of the invention will be the sum of the invention induced distortion and the distortion imparted by the selected video codec 106 operating with a given set of parameters.

By varying the degree to which the spatial dimensions are altered and/or the complexity of the digital filters at run-time (e.g., collectively, the inventions run-time parameters), the invention allows the tradeoff between the pre-processing filter 102 and the post-processing filter 104 induced distortion, and video codec 106 induced distortion to be modulated at any desired granularity, from one video frame up to any arbitrary group of video frames, and the like. Optimal control over the invention's run-time parameters is based on the analysis of the characteristics of the original video 112, the desired output data-rate, and the rate-distortion performance of the selected video codec 106 without intervention by the invention.

For example, videos with fast motion, motion induced blur, focal blur, low contrast, low detail, or any suitable combination thereof, typically benefit from higher degrees of invention induced distortion. By contrast, videos with little or no motion, sharp focus, high contrast, high detail, or any suitable combination thereof, typically benefit from a lower degree of invention induced distortion.

Generally, as data rates for a given video are driven down (e.g., equivalently, as compression is increased), video codec induced distortion becomes more and more disturbing perceptually, and higher degrees of invention induced distortion become preferable to additional video codec induced distortion.

Figure 4:
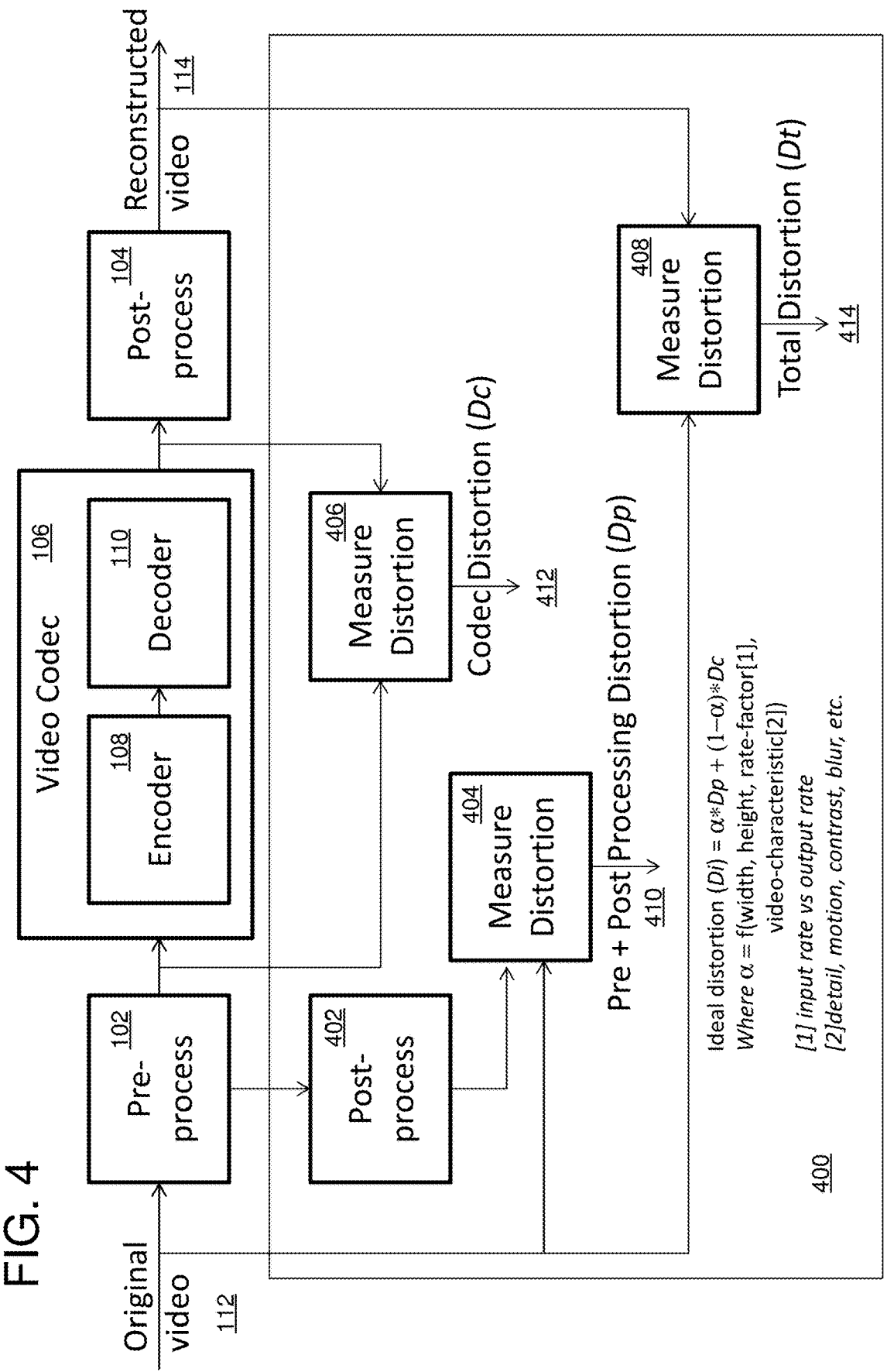
FIG. 4 shows a distortion measurement system that enables calculation of an ideal distortion trade-off and optimal run-time control.

FIG. 4 shows a distortion measurement system 400 that enables calculation of the ideal distortion trade-off, optimal run-time control, and the like. In FIG. 4, the following generalizations apply: (1) at very low data rate targets (e.g., equivalently, as compression is increased), invention induced distortion becomes preferable to additional video codec 106 induced distortion. The measurement system 400 can include a post processing stage 402, a distortion measuring stage 404 (e.g., to measure pre and post processing distortion 410), a distortion measuring stage 406 (e.g., to measure codec distortion 412), and a distortion measuring stage 408 (e.g., to measure total distortion 414).

Figure 5:
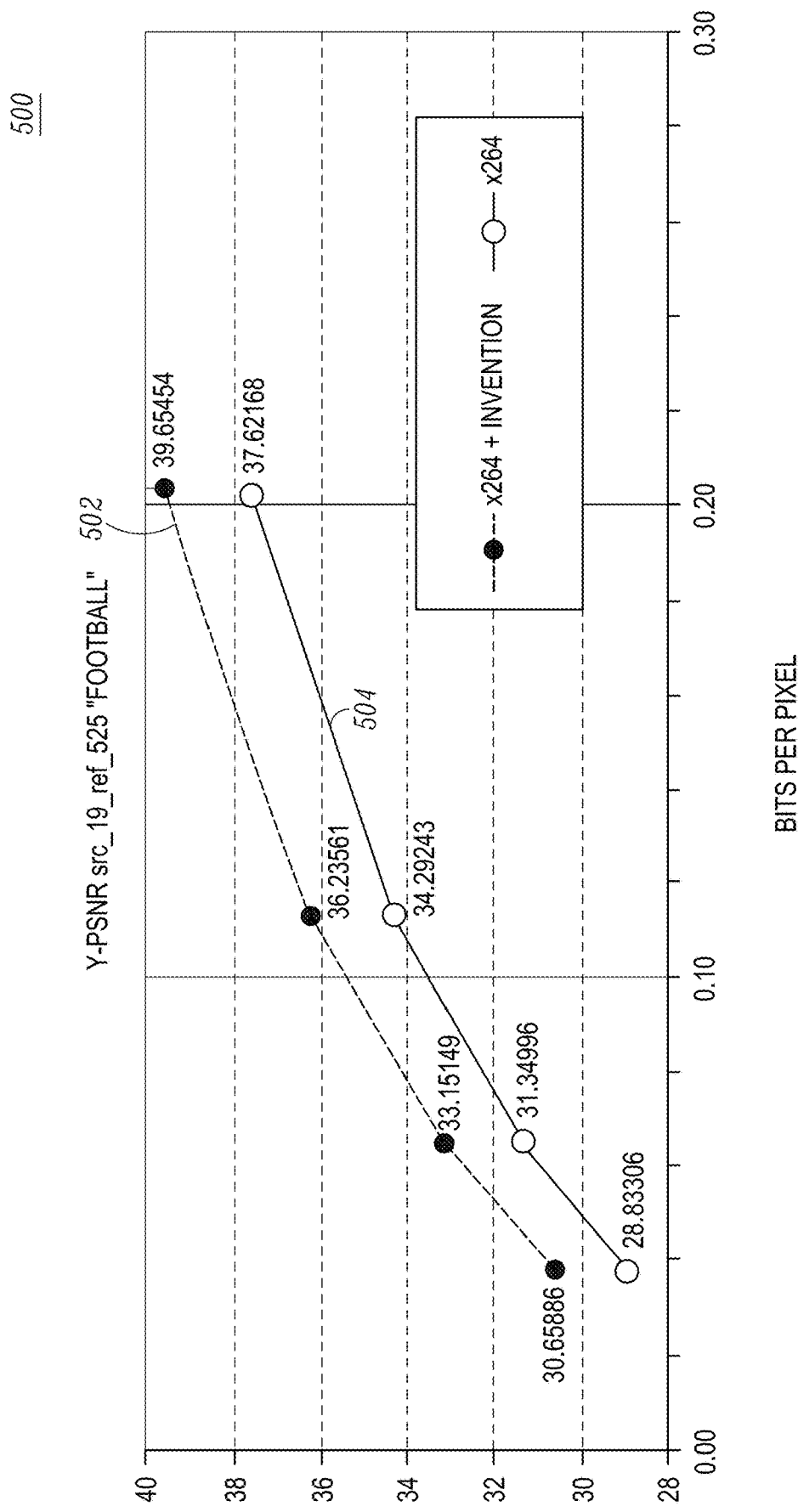
FIGS. 5 and 6 show the effectiveness of the invention when used in combination with the H.264 video codec protocol.
Figure 6:
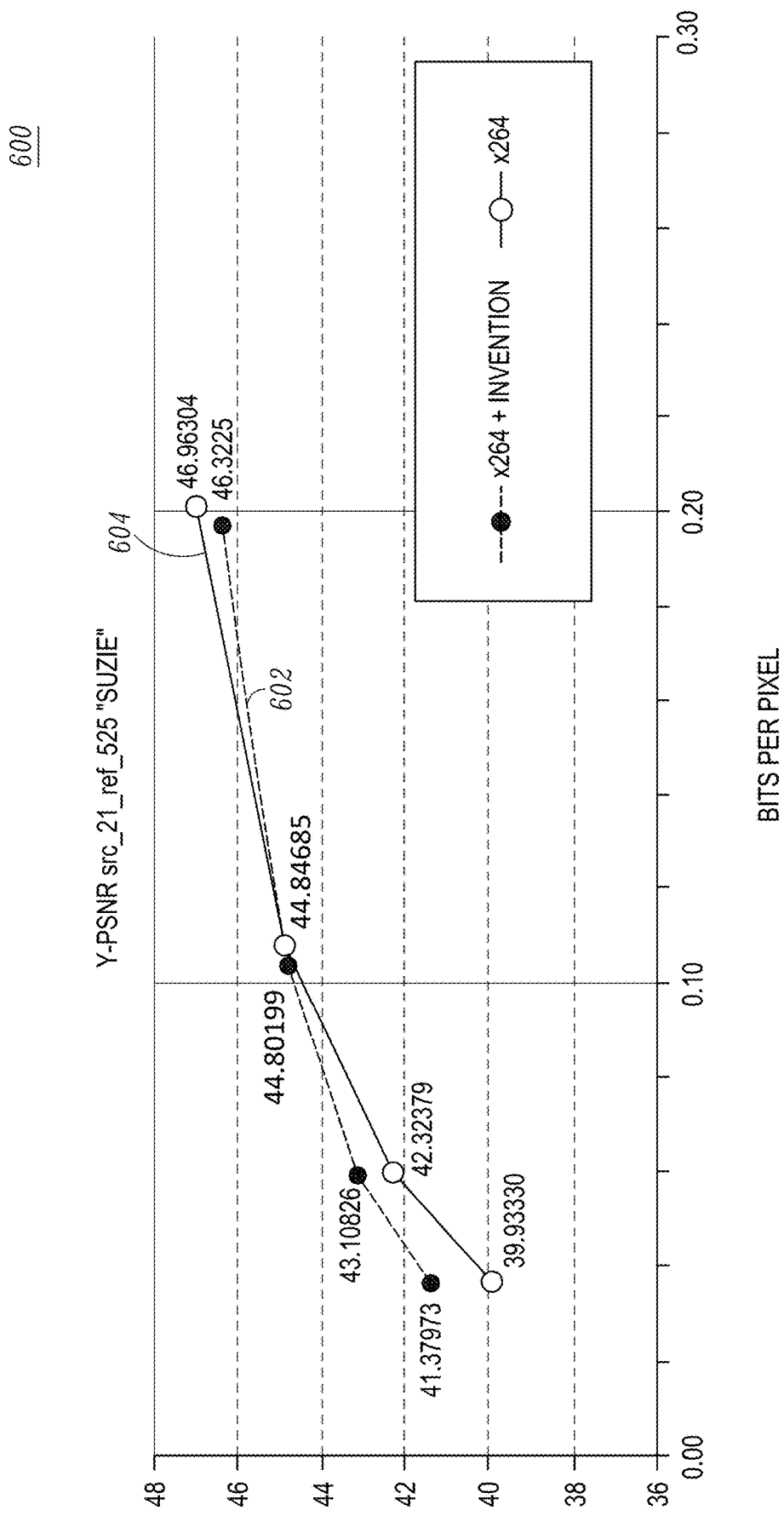

FIGS. 5 and 6 shows the effectiveness of the invention when used in combination with the H.264 video codec protocol. In FIG. 5, represented is a video with fast motion, motion induced blur, and focal blur. Under such conditions, invention induced distortion 502 provides benefits (e.g., as measured by YPSNR) across a wide range of target data-rates, as compared to H.264 protocol induced distortion 504.

In FIG. 6, on the other hand, represented is a video with little or no motion, sharp focus, and high contrast and detail. In this case, invention induced distortion 602 provides YPSNR based benefits at lower target data-rates, as compared to H.264 protocol induced distortion 604.

The following table provides a recipe for generating the results of FIGS. 5 and 6.

TABLE

| Recipe for generating FIG. 5 and FIG. 6 results | | | |
|---|---|---|---|
| Source video (VQEG) | src19_ref_525 src21_ref_525 | | |
| Preparation | Interlaced to progressive scan conversion using Yadif interpolation top field Center crop to 640x480 VGA | | |
| Pre-processing filter | Lanczos a = 3 Sinc-weighted-sinc | | |
| Downscale-factor | 2 | | |
| Video Codec | x264 (H.264) | | |
| Video Codec Parameters | Preset: Medium, Tuning: none, Profile: baseline, Level: auto, rate-control: singlepass ratefactor-based | | |
| | Source | Codec Alone | Invention |
| Rate parameters (target bit-rates) | src19_ref_525 | crf 25 crf 30 crf 35 crf 40 | crf 16.1 crf 21.5 crf 26.3 crf 30.5 |
| | src21_ref_525 | crf 17 crf 21 crf 25 crf 29 | crf 11 crf 15 crf 18.6 crf 21.7 |
| Post-processing filter | Lanczos a = 3 Sinc-weighted-sinc | | |
| Upscale-factor | 2 | | |

The results illustrated in FIGS. 5 and 6 can be reproduced, based on the above table, and the following steps, for example, as follows:

Step 1: Acquire and prepare the source video sequence ("Original Video"),

Step 2: Video codec alone:

(a) Encode the Original Video sequence at various different bit-rate (e.g., bits-per-pixel) targets with the prescribed video codec, producing one "Encoded Original Video Stream" per bit-rate target.

(b) Decode each Encoded Original Video Stream with the prescribed video codec (e.g., "Decoded Original Video").

(c) Perform YPSNR comparison between Original Video and Decoded Original Video.

(d) Graph YPSNR vs bits-per-pixel for each Encoded Original Video Stream.

Step 3: Video Codec plus invention:

(a) Apply prescribed pre-processing downscale filter with the prescribed scale-factor to produce the codec input video sequence (e.g., "Pre-processed Video").

(b) Encode the Pre-processed Video sequence at various different bit-rate (e.g., bits-per-pixel) targets with the prescribed video codec, producing one "Encoded Video Stream" per bit-rate target.

(c) Decode each Encoded Video Stream with the prescribed video codec (e.g., "Decoded Video").

(d) Apply prescribed post-processing upscale filter of prescribed scale-factor (e.g., "Reconstructed Video").

(e) Perform YPSNR comparison between Original Video and Reconstructed Video.

(f) Graph YPSNR vs bits-per-pixel for each of the Encoded Video Stream.

The above-described devices and subsystems of the illustrative embodiments can include, for example, any suitable servers, workstations, PCs, laptop computers, PDAs, Internet appliances, handheld devices, cellular telephones, wireless devices, other electronic devices, and the like, capable of performing the processes of the illustrative embodiments.

The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, cable communications networks, satellite communications networks, G3 communications networks, Public Switched Telephone Network (PSTNs), Packet Data Networks (PDNs), the Internet, intranets, WiMax Networks, a combination thereof, and the like.

It is to be understood that the devices and subsystems of the illustrative embodiments are for illustrative purposes, as many variations of the specific hardware and/or software used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present invention. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, application processors, domain specific processors, application specific signal processors, and the like, programmed according to the teachings of the illustrative embodiments of the present invention, as will be appreciated by those skilled in the computer and software arts. Appropriate software can be readily prepared by programmers of ordinary skill based on the teachings of the illustrative embodiments, as will be appreciated by those skilled in the software art. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present invention for performing all or a portion (e.g., if processing is distributed) of the processing performed in implementing the illustrative embodiments. Computer code devices of the illustrative embodiments of the present invention can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present invention can be distributed for better performance, reliability, cost, and the like.

As stated above, the devices and subsystems of the illustrative embodiments can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, flash memories, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave, or any other suitable medium from which a computer can read.

While the present invention have been described in connection with a number of illustrative embodiments and implementations, the present invention is not so limited, but rather covers various modifications and equivalent arrangements, which fall within the purview of the appended claims.

What is claimed is:

1. A system for improving video codec performance, the system comprising:
   a pre-processing digital filter receiving an input video signal and generating a pre-processed video signal, based on the input video signal;
   a video codec having an encoder receiving the pre-processed video signal, and generating an encoded video signal, based on the pre-processed video signal, a having a decoder, receiving the encoded video signal, and generating a decoded video signal based on the encoded video signal;
   a first post-processing digital filter receiving the decoded video signal, and generating a reconstructed video signal, based on the decoded video signal;
   a second post-processing digital filter receiving the pre-processed video signal, and generating a post-processed video signal, based on the pre-processed video signal;
   a first analytical distortion measurement calculator that calculates, in real-time, pre and post processing induced distortion (Dp), based on at least one of signal to noise ratio (SNR) metric, a difference metric, and a similarity metric, between the input video signal, and the post-processed video signal;
   a second analytical distortion measurement calculator that calculates, in real-time, video codec induced distortion (Dc), based on at least one of signal to noise ratio (SNR) metric, a difference metric, and a similarity metric, between the pre-processed video signal, and the decoded video signal; and
   a third analytical distortion measurement calculator that calculates, in real-time, total induced distortion (Dt), based on at least one of signal to noise ratio (SNR) metric, a difference metric, and a similarity metric, between the input video signal, and the reconstructed video signal,
   wherein the pre and post processing induced distortion (Dp), the video codec induced distortion (Dc), and the total induced distortion (Dt) are used to control, in real time, run-time parameters of the video codec, and
   wherein run-time parameters of the pre-processing digital filter, and the first post-processing digital filter are dynamically controlled, in real-time, based on at least one of a desired output data-rate, and characteristics of the input video signal.

2. The system of claim 1, wherein a cutoff frequency of the pre-processing digital filter and post-processing digital filters are based on high spatial frequencies and low contrast sensitivity.

3. The system of claim 1, wherein the characteristics of the input video signal comprise at least a degree of motion induced blur or of focal blur in the input video signal.

4. The system of claim 1, wherein the characteristics of the input video signal comprise a degree of motion in the input video signal.

5. The system of claim 1, wherein the characteristics of the input video signal comprise a degree of contrast in the input video signal.

6. The system of claim 1, wherein the characteristics of the input video signal comprise a level of detail in the input video signal.

7. The system of claim 1, wherein the distortion Dt, De and Dp are based on a level of difference or similarity between the input video signal and the reconstructed video signal.

8. A computer-implemented method for improving video codec performance, the method comprising:
   receiving with a pre-processing digital filter an input video signal and generating a pre-processed video signal, based on the input video signal;
   receiving with an encoder of a video codec the pre-processed video signal, and generating an encoded video signal, based on the pre-processed video signal, receiving a with a decoder of the video codec, the encoded video signal, and generating a decoded video signal based on the encoded video signal;
   receiving with a first post-processing digital filter the decoded video signal, and generating a reconstructed video signal, based on the decoded video signal;
   receiving with a second post-processing digital filter the pre-processed video signal, and generating a post-processed video signal, based on the pre-processed video signal;
   calculating with a first analytical distortion measurement calculator, in real-time, pre and post processing induced distortion (Dp), based on at least one of signal to noise ratio (SNR) metric, a difference metric, and a similarity metric, between the input video signal, and the post-processed video signal;
   calculating with a second analytical distortion measurement, in real-time, video codec induced distortion (Dc), based on at least one of signal to noise ratio (SNR) metric, a difference metric, and a similarity metric, between the pre-processed video signal, and the decoded video signal;
   calculating with a third analytical distortion measurement calculator, in real-time, total induced distortion (Dt), based on at least one of signal to noise ratio (SNR) metric, a difference metric, and a similarity metric, between the input video signal, and the reconstructed video signal;
   controlling, in real time, run-time parameters of the video codec based on the pre and post processing induced distortion (Dp), the video codec induced distortion (Dc), and the total induced distortion (Dt); and
   dynamically controlling, in real-time, run-time parameters of the pre-processing digital filter, and the first post-processing digital filter, based on at least one of desired output data-rate, and characteristics of the input video signal.

9. The method of claim 8, wherein a cutoff frequency of the pre-processing digital filter and post-processing digital filters are based on high spatial frequencies and low contrast sensitivity.

10. The method of claim 8, wherein the characteristics of the input video signal comprise at least a degree of motion induced blur or of focal blur in the input video signal.

11. The method of claim 8, wherein the characteristics of the input video signal comprise a degree of motion in the input video signal.

12. The method of claim 8, wherein the characteristics of the input video signal comprise a degree of contrast in the input video signal.

13. The method of claim 8, wherein the characteristics of the input video signal comprise a level of detail in the input video signal.

14. The method of claim 8, wherein the distortion Dt, De and Dp are based on a level of difference or similarity between the input video signal and the reconstructed video signal.

15. A non-transitory computer-readable medium for improving video codec performance and with instructions stored thereon, that when executed by a processor, perform the steps comprising:

receiving with a pre-processing digital filter an input video signal and generating a pre-processed video signal, based on the input video signal;

receiving with an encoder of a video codec the pre-processed video signal, and generating an encoded video signal, based on the pre-processed video signal, receiving a with a decoder of the video codec, the encoded video signal, and generating a decoded video signal based on the encoded video signal;

receiving with a first post-processing digital filter the decoded video signal, and generating a reconstructed video signal, based on the decoded video signal;

receiving with a second post-processing digital filter the pre-processed video signal, and generating a post-processed video signal, based on the pre-processed video signal;

calculating with a first analytical distortion measurement calculator, in real-time, pre and post processing induced distortion (Dp), based on at least one of signal to noise ratio (SNR) metric, a difference metric, and a similarity metric, between the input video signal, and the post-processed video signal;

calculating with a second analytical distortion measurement, in real-time, video codec induced distortion (Dc), based on at least one of signal to noise ratio (SNR) metric, a difference metric, and a similarity metric, between the pre-processed video signal, and the decoded video signal;

calculating with a third analytical distortion measurement calculator, in real-time, total induced distortion (Dt), based on at least one of signal to noise ratio (SNR) metric, a difference metric, and a similarity metric, between the input video signal, and the reconstructed video signal;

controlling, in real time, run-time parameters of the video codec based on the pre and post processing induced distortion (Dp), the video codec induced distortion (Dc), and the total induced distortion (Dt); and dynamically controlling, in real-time, run-time parameters of the pre-processing digital filter, and the first post-processing digital filter, based on at least one of desired output data-rate, and characteristics of the input video signal.

16. The computer-readable medium of claim 15, wherein a cutoff frequency of the pre-processing digital filter and post-processing digital filters are based on high spatial frequencies and low contrast sensitivity.

17. The computer-readable medium of claim 15, wherein the characteristics of the input video signal comprise at least a degree of motion induced blur or of focal blur in the input video signal.

18. The computer-readable medium of claim 15, wherein the characteristics of the input video signal comprise a degree of motion in the input video signal.

19. The computer-readable medium of claim 15, wherein the characteristics of the input video signal comprise a degree of contrast in the input video signal.

20. The computer-readable medium of claim 15, wherein the characteristics of the input video signal comprise a level of detail in the input video signal.

21. The computer-readable medium of claim 15, wherein the distortion Dt, De and Dp are based on a level of difference or similarity between the input video signal and the reconstructed video signal.

* * * * *